US006364206B1

(12) United States Patent
Keohane

(10) Patent No.: US 6,364,206 B1
(45) Date of Patent: Apr. 2, 2002

(54) LOTTERY TICKET SALES IN FUELING FORECOURT

(75) Inventor: Denis J. Keohane, Dry Fork, VA (US)

(73) Assignee: Marconi Commerce Systems Inc., Greensboro, NC (US)

(*) Notice: Subject to any disclaimer, the term of this patent is extended or adjusted under 35 U.S.C. 154(b) by 0 days.

(21) Appl. No.: 09/487,769

(22) Filed: Jan. 19, 2000

(51) Int. Cl.[7] .................................. G06F 7/08
(52) U.S. Cl. .................. 235/381; 235/380; 235/379; 235/375
(58) Field of Search .................. 235/381, 375; 705/13, 16, 17

(56) References Cited

U.S. PATENT DOCUMENTS

| 3,786,421 A | * | 1/1974 | Wostl et al. ............ 235/61.7 B |
| 4,669,730 A | | 6/1987 | Small .................... 273/138 A |
| 4,832,341 A | | 5/1989 | Muller et al. .............. 273/139 |
| 4,833,307 A | * | 5/1989 | Gonzalez-Justiz .......... 235/375 |
| 5,216,595 A | * | 6/1993 | Protheroe .................. 364/412 |
| 5,408,417 A | | 4/1995 | Wilder ...................... 364/479 |
| 5,493,315 A | * | 2/1996 | Atchley ................ 235/381 X |
| 5,673,309 A | | 9/1997 | Woynoski et al. .......... 379/114 |
| 5,859,416 A | * | 1/1999 | Gatto ........................ 235/384 |
| 5,945,975 A | * | 8/1999 | Lundrigan et al. .......... 345/133 |
| 5,950,898 A | * | 9/1999 | Menna ....................... 225/106 |
| 5,980,090 A | * | 11/1999 | Royal, Jr. et al. ....... 364/479.11 |
| 6,026,868 A | * | 2/2000 | Johnson, Jr. ................. 141/94 |
| 6,032,126 A | * | 2/2000 | Kaehler ...................... 705/16 |
| 6,073,840 A | * | 6/2000 | Marion ....................... 235/381 |
| 6,077,889 A | * | 6/2000 | Kaehler et al. ............. 235/381 |
| 6,116,505 A | * | 9/2000 | Withrow ..................... 235/381 |
| 6,184,846 B1 | * | 2/2001 | Myers et al. ................ 343/895 |
| 6,193,154 B1 | * | 2/2001 | Phillips et al. ............. 235/381 |

FOREIGN PATENT DOCUMENTS

WO    WO 96/06415    *   2/1996

OTHER PUBLICATIONS

Grant, Mary Lee, "Lottery No Prize For Some" Corpus Christi Caller—Times Online, Mar. 16, 1998 (www.caller.com/newsarch/news10833.html).

"National Center For Policy Analysis—Idea House," date believed to be in 1997 (www.ncpa.org/~ncpa/pd/social/spaug98b.html) *Month Missing.

"Holy Multiple Millionaires!" ABC News Online, Jul. 30, 1998 (abcnews.go.com/sections/us/DailyNews/powerball_980730.html).

* cited by examiner

Primary Examiner—Karl D. Frech
Assistant Examiner—Daniel Walsh
(74) Attorney, Agent, or Firm—Withrow & Terranova PLLC

(57) ABSTRACT

A system enables lottery ticket transactions in a fueling forecourt by permitting the purchase of lottery tickets at a fuel dispenser. In the system, customers pay for lottery tickets through the fuel dispenser payment acceptors in conjunction with fuel purchases. Payment may be by cash, credit, or wireless credit storage device, with the cost of the lottery ticket or tickets added to the cost of the fueling transaction. The lottery ticket dispensers may be integrated within the individual fuel dispensers, one to each dispenser, or may be apart from the fuel dispensers with one or more lottery ticket dispensers located elsewhere within the forecourt area. The system provides a range of lottery ticket choices including pre-printed tickets, random-number tickets, and customer-number tickets. The system provides a convenient alternative to in-store lottery ticket transactions by allowing fueling customers to purchase and receive lottery tickets without need of entering the store.

40 Claims, 10 Drawing Sheets

LOTTERY TICKET SALES IN FUELING FORECOURT

FIELD OF THE INVENTION

The present invention generally relates to lottery ticket transactions and particularly relates to lottery ticket transactions conducted in a fueling forecourt.

BACKGROUND OF THE INVENTION

Many states authorize various games or lotteries in which lottery participants purchase one or more tickets in hopes of buying a "winning" ticket. With broad participation, the prize awards associated with such winning tickets are oftentimes in the millions or tens of millions of dollars. The chance, however small, to win all or a portion of such large awards compels even greater participation, sometimes sparking a frenzy of ticket purchases.

Because of their popularity, stores, particularly convenience stores, have strong incentive to make lottery tickets available at their premises. Indeed, store owners often receive a portion of sales proceeds on lottery tickets sold through their store and can enjoy increased customer traffic associated with general interest in the lottery. Conventionally, an in-store customer wishing to purchase a lottery ticket conducts the transaction through the same checkout clerk or attendant responsible for conducting general merchandise transactions. The amount of time required to purchase a lottery ticket varies with the nature of the ticket and the particular in-store lottery ticket dispensing system, but it can be significant with respect to other customers waiting in line. When a number of customers wish to purchase lottery tickets, the quality of service, as measured in terms of checkout waiting time, can degrade for all customers in the store. During times of particularly high lottery interest, a store's quality of service can degrade dramatically. Obviously, such reduction in quality of service is counterproductive to the interests of both storeowners and customers.

Accordingly, there remains a need for an alternate or supplemental means of purchasing lottery tickets that avoids in-store customer delays and yet allows a storeowner to benefit from the added customer draw associated with selling lottery tickets. As described in detail herein, the system of the present invention addresses these and other needs providing concomitant benefit for both the storeowner and customers.

SUMMARY OF THE INVENTION

The present invention includes both methods and apparatus for combining lottery ticket sales with fuel purchasing transactions conducted by a customer at an individual fuel dispenser. The system of the present invention offers a customer the option of purchasing one or more lottery tickets in conjunction with their fueling purchase. Various types of lottery tickets are available for purchase and include pre-printed, random-number, and customer-number ticket types. Each fuel dispenser in the system of the present invention includes a payment acceptor. In the preferred embodiment, the fuel dispenser payment acceptor includes a card reader for accepting credit and debit card payment, a cash acceptor for accepting cash payment, and a wireless communication interface for accepting payment via a wireless signal containing payment information transmitted by a wireless communication device. Alternate embodiments of the fuel dispenser may selectively omit the cash acceptor, the card reader, and the wireless communication interface at the expense of reduced customer convenience. The purchased lottery tickets are dispensed in a number of ways. In the preferred embodiment, each fuel dispenser includes an integral lottery ticket dispenser having its own lottery ticket printer. The ticket printer includes adaptations that allow it to dispense pre-printed tickets as well as tickets printed at the time of sale. In an alternate embodiment, the receipt printer included in the fuel dispenser may be adapted to additionally provide lottery ticket printing and dispensing capabilities. In still other embodiments, lottery tickets are purchased through the fuel dispenser but actually dispensed from a lottery ticket dispenser apart from the fuel dispenser. In this embodiment, the lottery ticket dispenser may be associated with more than one fuel dispenser, such as a group of fuel dispensers at a fueling island, or even groups of fueling islands.

DETAILED DESCRIPTION OF THE INVENTION

Figure 1A:
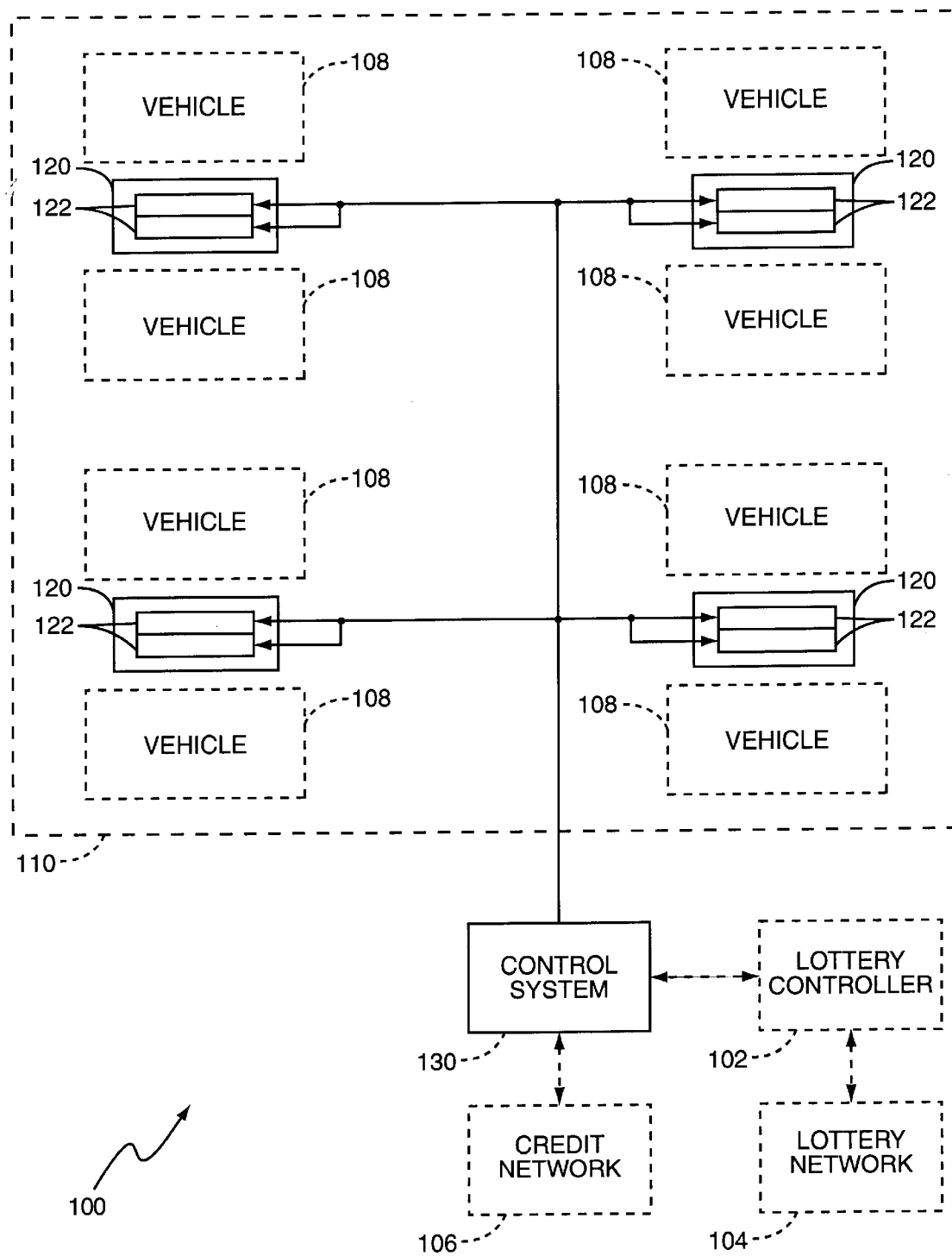
FIG. 1A provides a simplified block diagram of a fueling system in the preferred embodiment of the present invention.

FIG. 1A provides a simplified overview of a fuel dispensing system 100 in accord with the preferred embodiment of the present invention. A forecourt area 110 contains a plurality of fueling islands 120 arranged in a manner providing convenient access for refueling a vehicle 108. A control system 130 communicates with each fuel dispenser 122 and monitors or controls certain aspects of the fuel dispensers' 122 operation. Typically, the control system 130 is located apart from the fuel dispenser 122 within an associated store or service building (not shown).

In the preferred embodiment of the present invention, the fuel dispensers 122 each include features that permit a customer conducting a fueling transaction additionally to select, pay for and receive lottery tickets at the fuel dispenser 122. As part of the fueling transaction, the fuel dispensing system 100 provides a customer at a given fuel dispenser 122 the option to purchase one or more lottery tickets of various types. If the customer elects to purchase a lottery ticket, features included in the fuel dispenser 122 permit the customer to select the type and quantity of lottery tickets desired. Costs associated with the lottery ticket purchase are added to fueling costs, along with the costs for any other goods or services purchased at the fuel dispenser 122, to calculate a total transaction cost which is paid for by the customer at the fuel dispenser 122.

The control system 130 additionally communicates with various other systems through direct or network connections. In support of credit or debit card payments at the fuel dispensers 122, the control system 130 communicates with an outside credit authorization network 106. The control system 130 uses the credit authorization network 106 to confirm credit authorization for a customer's credit or debit card, and communicates transaction information, including costs, back to the credit authorization network 106.

In the preferred embodiment, the control system 130 also communicates with a lottery controller 102 to support the purchase of lottery tickets through the fuel dispensers 122. The lottery controller 102 is typically a specialized processing platform provided by the lottery authority and includes secure apparatus for processing lottery ticket transactions. Commonly, the lottery controller 102 communicates with the lottery authority to its connection to a lottery authority network 104. Cooperative operation between the lottery controller 102 and the control system 130 alleviates some processing security burdens that would otherwise be placed on the control system 130 and fuel dispensers 122. For example, in the preferred embodiment, the control system 130 relies on the lottery controller 102 to generate random number information for certain types of lottery tickets and to store critical lottery ticket transaction information regarding type, quantity, and number of tickets sold through the fuel dispensers 122. In alternate embodiments, the fuel dispensers 122 or the fuel dispensers 122 in combination with the control system 130 are adapted to include all lottery ticket transaction processing, thereby eliminating the need for the lottery controller 102. Normally, some form of the lottery ticket controller 102 will be present at the convenience store because it is needed to support in-store lottery ticket transactions.

Figure 1B:
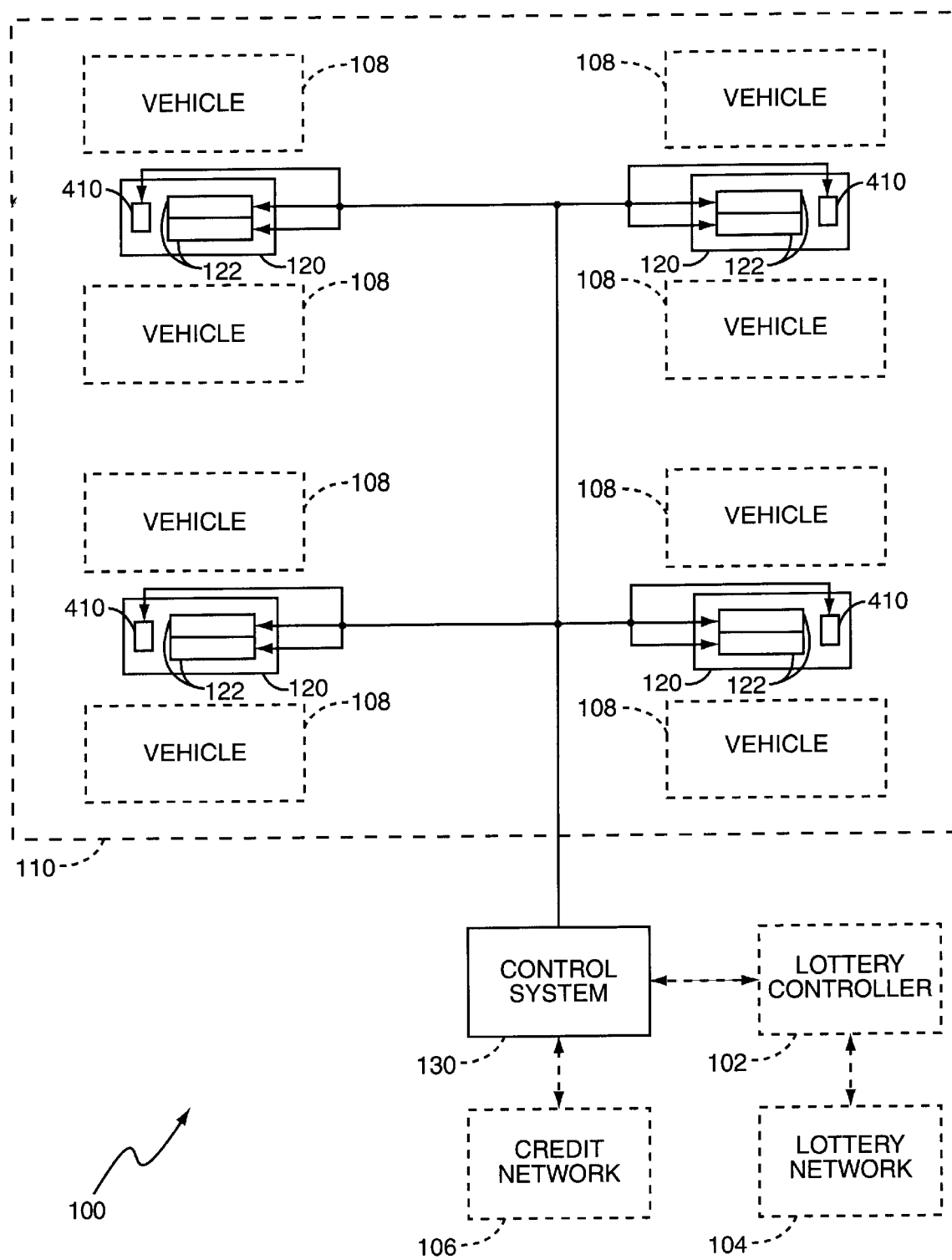
FIG. 1B provides a simplified block diagram of a fueling system in an alternate embodiment of the present invention.

FIG. 1B depicts an alternate embodiment of the present invention wherein a separate lottery ticket dispenser 410 is located at each fueling island 120. The lottery ticket dispensers 410 are arranged in a manner providing safe and convenient access at each fueling island 120. A single lottery ticket dispenser 410 may be associated with more than one fuel dispenser 122. Indeed, it is anticipated that a lottery ticket dispenser 410 at a given fueling island 120 will support all fuel dispensers 122 at that given fueling island 120. Importantly, a customer still selects and pays for the desired lottery tickets at the fuel dispenser 122. The control system 130 is adapted to cause a particular lottery ticket dispenser 410 to dispense the appropriate lottery ticket or tickets in conjunction with a transaction conducted at one of its associated fuel dispensers 122.

Figure 1C:
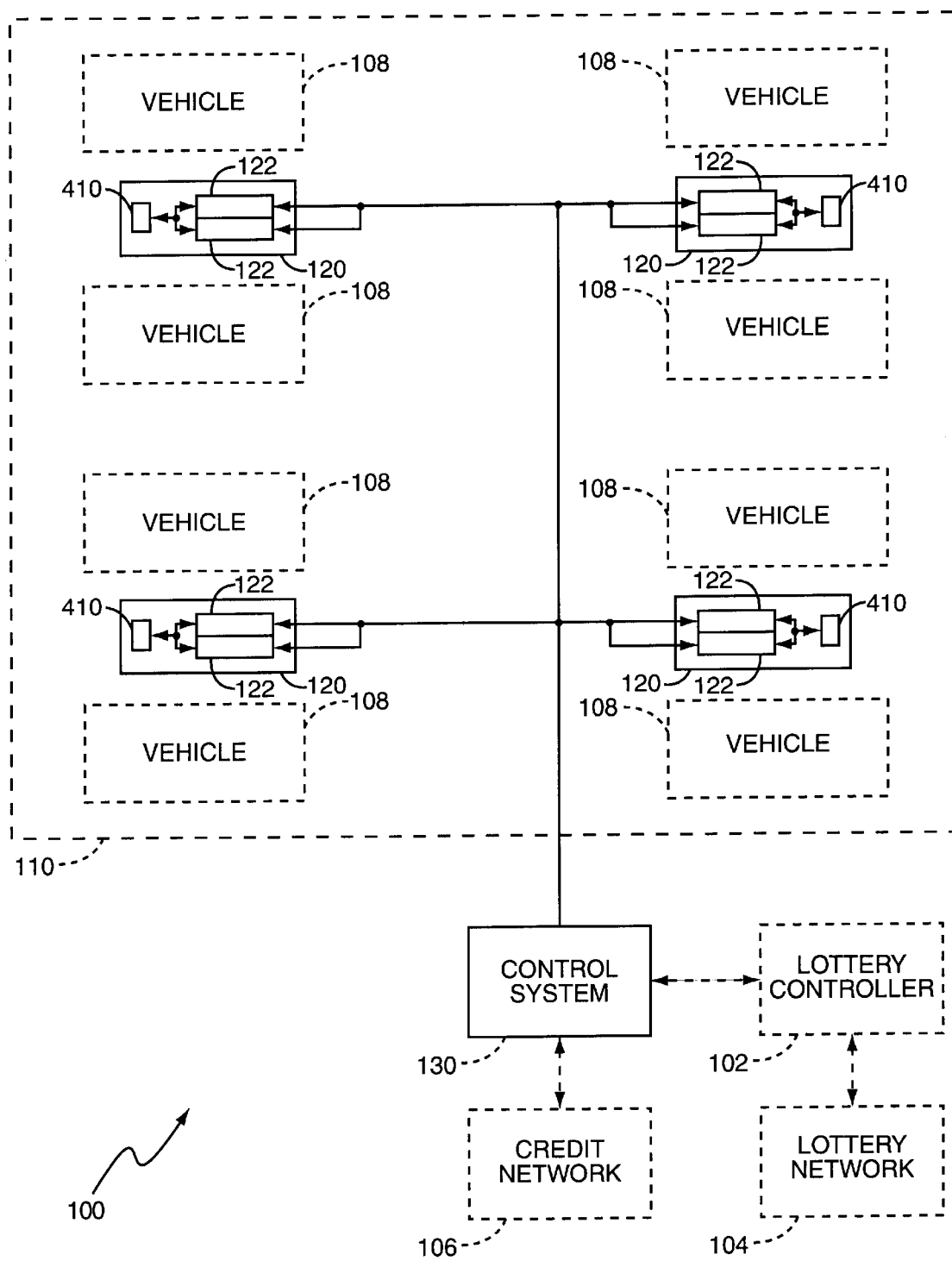
FIG. 1C provides a simplified block diagram of a fueling system in another embodiment of the present invention.

FIG. 1C depicts another embodiment of the present invention wherein, like the embodiment depicted in FIG. 1B, a separate lottery ticket dispenser 410 is located at each fueling island 120. However, in this embodiment, a given lottery ticket dispenser 410 communicates directly with its associated fuel dispensers 122 and in directly with the control system 130 via those associated fuel dispensers 122. In this context, "associated fuel dispensers 122" simply means those fuel dispensers 122 at the same fueling island where that particular lottery ticket dispenser 410 is located.

Figure 1D:
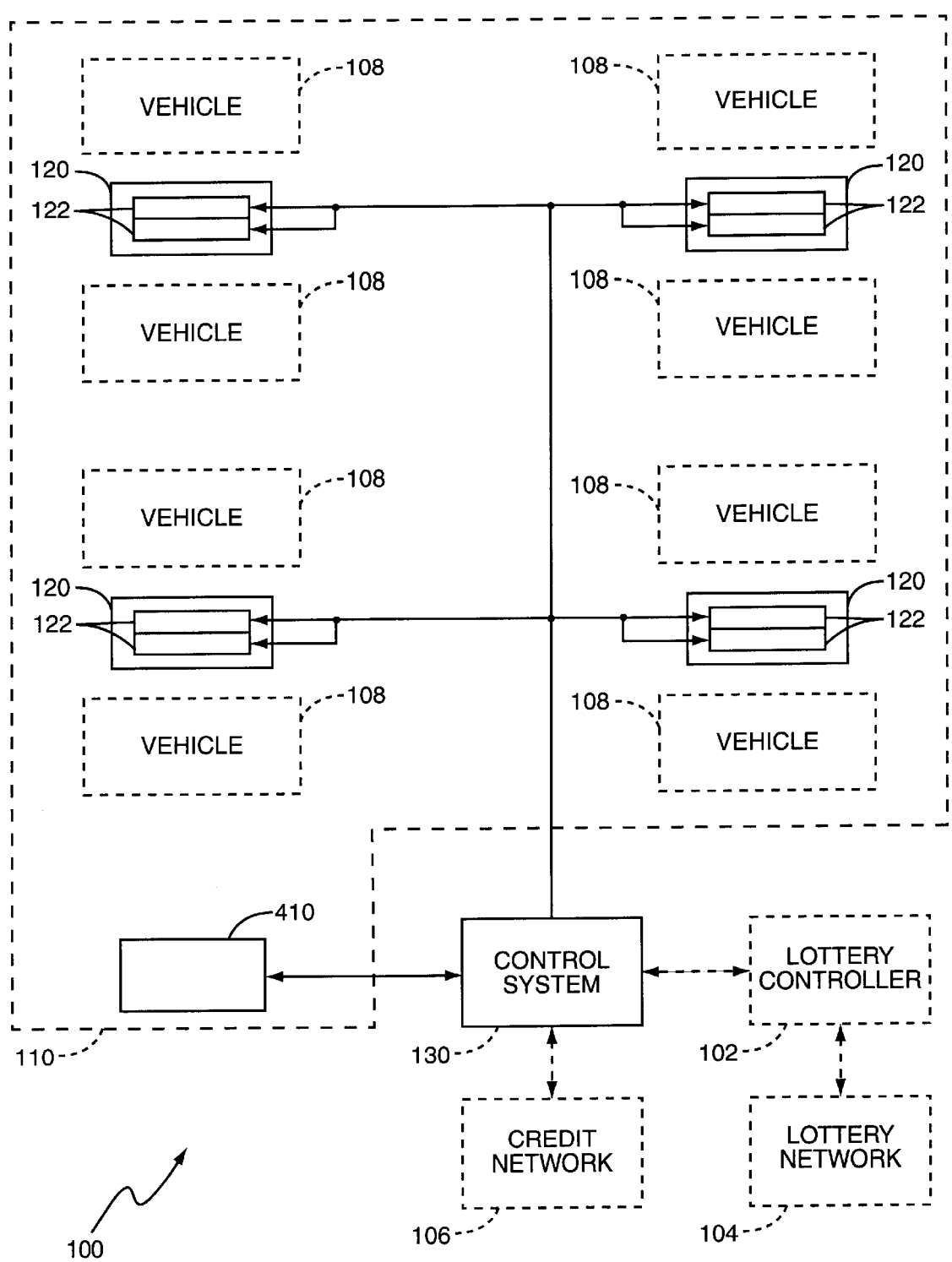
FIG. 1D provides a simplified block diagram of a fueling system in an additional embodiment of the present invention.

FIG. 1D depicts still another embodiment of the present invention wherein a single lottery ticket dispenser 410 is associated with a plurality of fuel dispensers 122 located at a plurality of different fueling islands 120. The lottery ticket dispenser 410 is placed at a convenient and safe location somewhere within the forecourt area 110. The lottery ticket dispenser communicates with the control system 130 and is adapted to dispense lottery tickets based on the individual transactions conducted at the plurality of fuel dispensers 122. Thus, customers may still purchase lottery tickets at the respective fuel dispensers 122 and take delivery of their purchased lottery tickets at the separate lottery ticket dispenser 410 all without leaving the forecourt area 110. Dispensing lottery tickets in the forecourt area is advantageous because it reduces the amount of customer traffic entering the convenience store for the sole or primary purpose of purchasing lottery tickets.

As will be obvious to those skilled in the art, the particular means by which the various fuel dispensers 122 and the control system 130 communicate with the lottery ticket dispenser 410 are not critical to practicing the inventive concept of the present invention. Indeed, as has been illustrated, the lottery ticket dispensing functionality may be integrated within a fuel dispenser 122 or incorporated remotely in a separate lottery ticket dispenser 410. Further, a separate lottery ticket dispenser 410 may service a single fuel dispenser 122, or may service a plurality of fuel dispensers 122. An important aspect of the present invention is that the lottery ticket selection and payment activities are supported directly through the interface means of the fuel dispensers 122.

Figure 2:
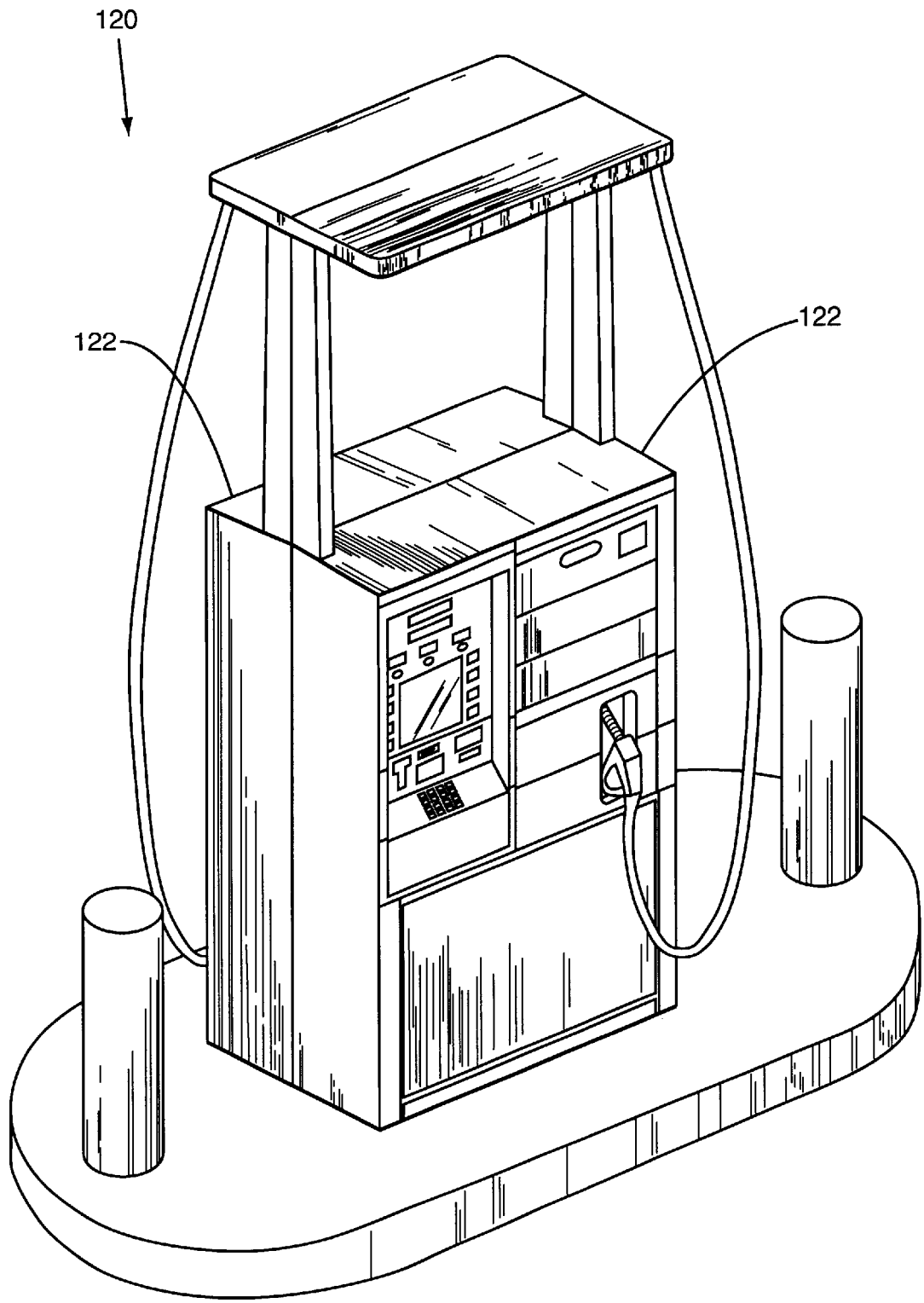
FIG. 2 provides a simplified perspective view of a fueling island in a preferred embodiment of the present invention with fuel dispensers and integral lottery ticket dispensers.

FIG. 2 depicts a typical fueling island 120 in accordance with the preferred embodiment of the present invention. Fuel dispensers 122 are arranged to facilitate customer access from opposing sides of the fueling island 120. The fueling island 120 includes typical curbing and barriers to protect the fuel dispensers 122 from damage, as might be caused by errant motor vehicles. Each fuel dispenser 122 includes features supporting the selection and purchase of those fuel and lottery tickets, as well as other goods and services available from the associated convenience store. Further, each fuel dispenser 122 includes the integrated capability of physically dispensing lottery tickets to a customer conducting a transaction that includes the purchase of lottery tickets.

Figure 3:
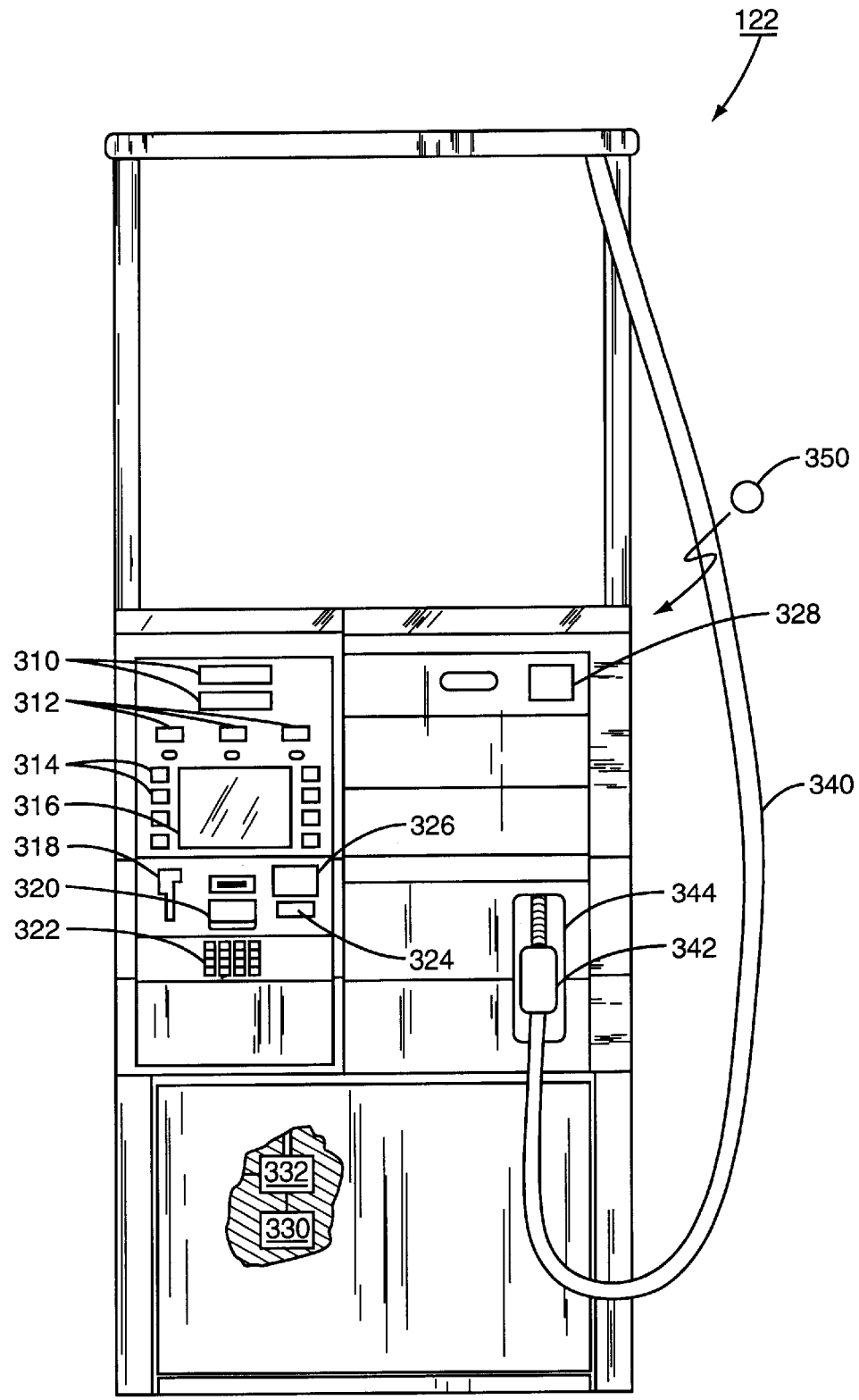
FIG. 3 provides a front-view of a fuel dispenser with integrated lottery ticket dispenser in the preferred embodiment of the present invention.

FIG. 3 provides more detail regarding the fuel dispenser 122 in a preferred embodiment of the present invention. Each fuel dispenser 122 includes a conventional nozzle 342, coupled to the fuel dispenser 122 by a conventional hose 340, and resting on a boot 344. A plurality of buttons 312 allow fuel grade selection, while conventional displays 310 provide information such as gallons pumped and associated cost. The fuel dispenser 122 also includes a display 316, which is preferably capable of displaying a mix of text and graphics. Additionally, the fuel dispenser 122 includes a printer 326 as well as a magnetic card reader 318, a cash acceptor 320 and additional keypads 322 and 314. Keypad 322 may be an alphanumeric keypad for the entry of a PIN or the like, while keypad 314 is preferably tied to display 316 enabling selections thereon. Implementing display 316 as a touch-screen eliminates the need for keypad 314. Additionally, the fuel dispenser 122 includes a dispenser controller 322 associated with an attached memory 330. The dispenser controller 322 controls operation of the fuel dispenser 122 in cooperation with certain information received from the control system 130. Note that in certain fueling environments, individual fuel dispensers are not controlled by a common control system 130 (sometimes referred to as a "site controller"). In such installations, the fuel dispenser controller 322 provides dispensing and payment control for the fuel dispenser 122. As such, the fuel dispenser controller 322 serves as the control system for fuel dispenser operations, including lottery ticket transactions.

The fuel dispenser 122 also includes a wireless communication interface 328 used for, among other things, receiving a signal from a wireless communications device 350 containing certain customer information supporting transaction payments. Thus, a customer may use such a wireless communications device 350 to pay for transactions at the fuel dispenser 122 instead of using a credit card or cash.

In addition to operating as a fuel dispenser, the fuel dispenser 122 also includes features supporting lottery ticket dispensing operations, including a lottery ticket printer 324 that is adapted to dispense lottery tickets printed on a per-transaction basis, as well as to dispense pre-printed lottery tickets. As part of the fueling transaction, the fuel dispenser 122 displays prompts on the display 316 encouraging the customer to purchase a lottery ticket. If the customer responds affirmatively to such prompts, they are given the opportunity to select the type of lottery ticket desired. Various options may be available for lottery ticket types depending on the number of lottery games the storeowner or lottery authorities wish to make available to customers at the fuel dispensers 122. Using on-screen directions, the customer makes lottery ticket type and quantity selections and, when customer selections are complete and transaction payment is received, the control system 130 causes the fuel dispenser 122 to dispense the appropriate lottery ticket or tickets from the lottery ticket printer 324.

As the fuel dispenser 122 includes a card reader 318, a cash acceptor 320, and a wireless communication interface, all generally grouped as a "payment acceptor," the customer has several different means available for payment of transaction costs, including the costs associated with their lottery ticket purchase. Typical ticket types available for purchase by a customer at a given fuel dispenser 122 include random-number, customer-selected number, and preprinted types. Further ticket type variations include those tickets good for multiple lottery drawings or a particular series of lottery games. Tickets of this last type require the customer to specify the desired lottery numbers of sets of numbers and the number of draws for which play is desired, all in accordance with whatever lottery rules exist for such multiple-draw tickets.

The customer makes their desired ticket type selections using the "customer interface" which includes the display 316 and keypads 314 and 322. For example, a customer selecting a customer-selected number ticket type would be prompted to input a desired number or set of numbers using the keypad 322 or keypad 314, supported by the visual information shown on display 316.

Figure 4:
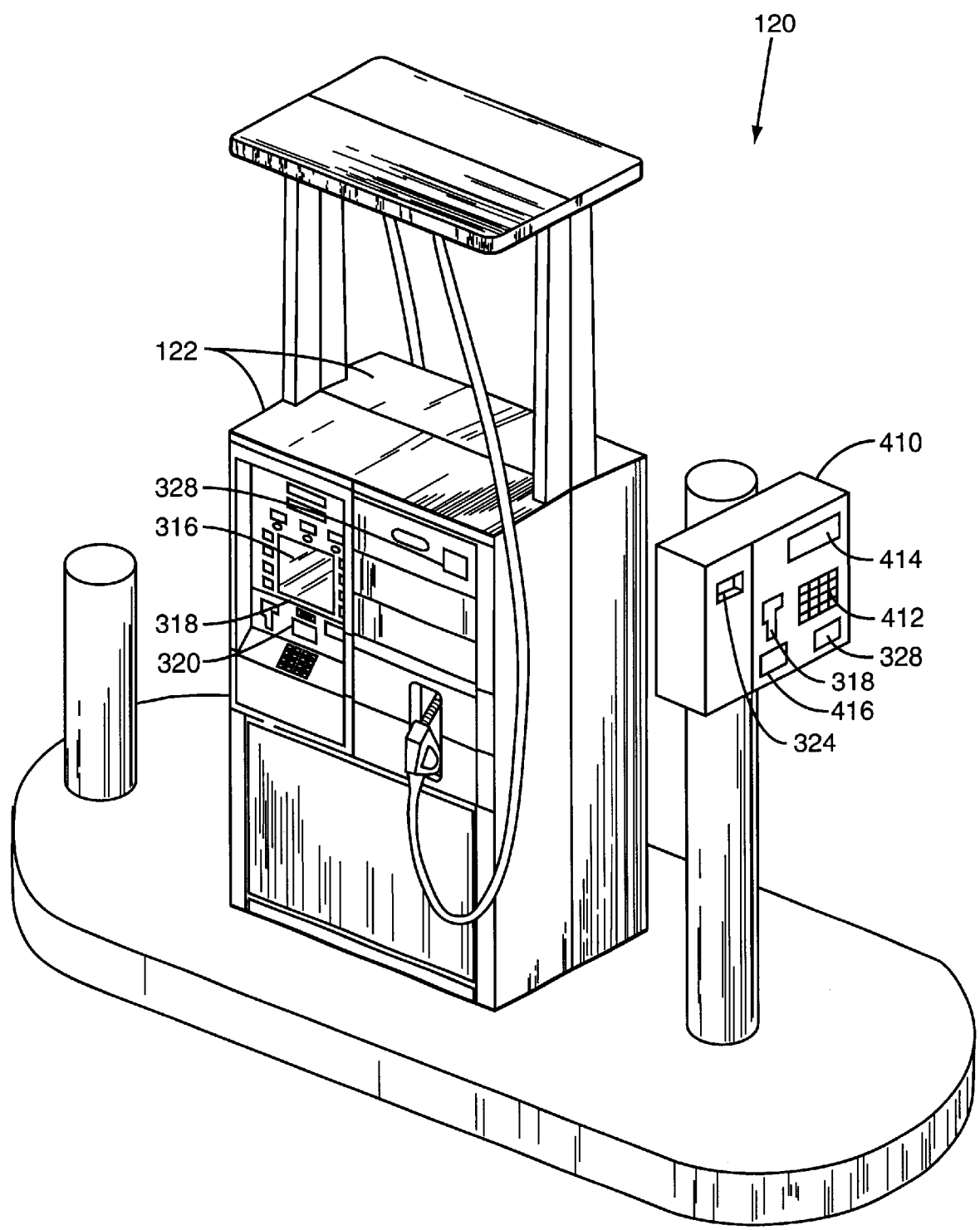
FIG. 4 provides a simplified perspective view of the fueling island in an alternate embodiment of the present invention with fuel dispensers and a proximate lottery ticket dispenser.

FIG. 4 depicts a fueling island 120 having a lottery ticket dispenser 410 separate from the fuel dispensers 122. Accordingly, the fuel dispensers 122 may omit certain features such as the lottery ticket printer 324, as they are not required to actually dispense the physical tickets in this embodiment of the present invention; however, customers still select and pay for their lottery tickets using the fuel dispensers 122. The separate lottery ticket dispenser 410 is positioned proximate the fuel dispensers 122 in a manner that allows convenient and safe access. Note that although FIG. 4 depicts the lottery ticket dispenser 410 at the fueling island 122, it may be located elsewhere in the forecourt 120 and associated with multiple fuel dispensers 122 at multiple fueling islands 120.

Communication links are not shown in FIG. 4 for the sake of simplicity. As earlier noted, the lottery ticket dispenser 410 may communicate directly with the fuel dispensers 122, or may communicate directly with the control system 130. Indeed, any means of providing lottery ticket transaction information between the fuel dispensers 122 and the lottery ticket dispenser 410 is considered within the scope of the present invention.

The lottery ticket dispenser 410 includes a lottery ticket printer 324 adapted to dispense preprinted lottery tickets, as well as to print and dispense other types of lottery tickets. Also included in lottery ticket dispenser 410 are a card reader 318, a keypad 412, an indicia scanner 416, and a wireless communication interface 328, each one providing alternate means of receiving a customer indicia. A display 414 may be used to provide visual information regarding lottery ticket dispensing activities.

Because the lottery ticket dispenser 410 is associated with multiple fuel dispensers 122, it is necessary to customers identify themselves so that the lottery ticket dispenser 410 may dispense the lottery ticket or tickets corresponding to an individual customer's particular lottery ticket purchase transaction.

One convenient means of providing a customer an identifying indicia is to cause the fuel dispensers 122 to print a transaction receipt that includes the identifying indicia. Thus, for a given customer concluding a transaction at a fuel dispenser 122 that included the purchase of one or more lottery tickets, the fuel dispenser 122 would print a unique indicia on the transaction receipt dispensed to the given customer. Subsequently, the given customer would input their unique indicia to lottery ticket dispenser 410 by holding the printed receipt proximate to the indicia scanner 416 included in the lottery ticket dispenser 410. Such indicia printing and scanning operations are well understood in the art and may be based on printed barcodes and barcode scanners, or may be based on magnetic printing and scanning methods, or other equivalent technologies.

An additional convenient means of assigning a unique indicia to an individual customer that has purchased lottery tickets at one of the fuel dispensers 122 arises for those customers paying by credit or debit card. Because payment authorization for the transaction, including the lottery ticket purchase, is based on a unique number or identifier associated with the credit or debit card, that same number or a derivative of it may be used at the lottery ticket dispenser 410 to identify a particular customer. In this method, the fuel dispenser 122 captures the credit or debit card information via its card reader 318 and communicates this information directly or indirectly to the lottery ticket dispenser 410. A customer that has paid for lottery tickets at any one of the fuel dispensers 122 using their credit or debit card subsequently places that same debit or credit card in another card reader 318 it is integral to the lottery ticket dispenser 410. The lottery ticket dispenser 410 uses the information obtained from the debit or credit card to dispense the lottery ticket or tickets exactly matching the selected by the customer during their transaction at the fuel dispenser 122.

Similar convenience may be afforded to those customers paying for fueling and lottery ticket purchase transactions a fuel dispenser 122 via a remote communications device 350. The remote communications device 350 transmits information including a unique customer indicia to the fuel dispenser 122 via the wireless communications interface 328 integral to the fuel dispenser 122. Thus, a customer that purchased lottery tickets at a fuel dispenser 122 using their remote communications device 350 may subsequently use that same remote communications device 350 for identifying themselves to the lottery ticket dispenser 410 via another wireless communications interface 328 that is integral to the lottery ticket dispenser 410. To do so, the customer simply holds the remote communications device 350 proximate to the wireless communications interface 328 of the lottery ticket dispenser 410.

As an additional alternative to the above described methods, the fuel dispenser 122 may display a unique customer indicia on its display 316 when a customer purchases lottery tickets as part of their fueling transaction. Subsequently, that customer would enter the unique customer indicia into the lottery ticket dispenser 410 using its integral keypad 412. With this method, the customer indicia is not based on any particular payment method and affords broad flexibility at the expense of slightly more customer inconvenience.

The particular method by which the system 100 of the present invention identifies a particular customer at the separate lottery ticket dispenser 410 is not important to practicing the inventive concept of the present invention. Indeed, any means that allows the separate lottery ticket dispenser 410 to associate a given customer with a specific lottery ticket purchase transaction conducted at any one of the remote fuel dispensers 122 is considered within the scope of the present invention.

Figure 5:
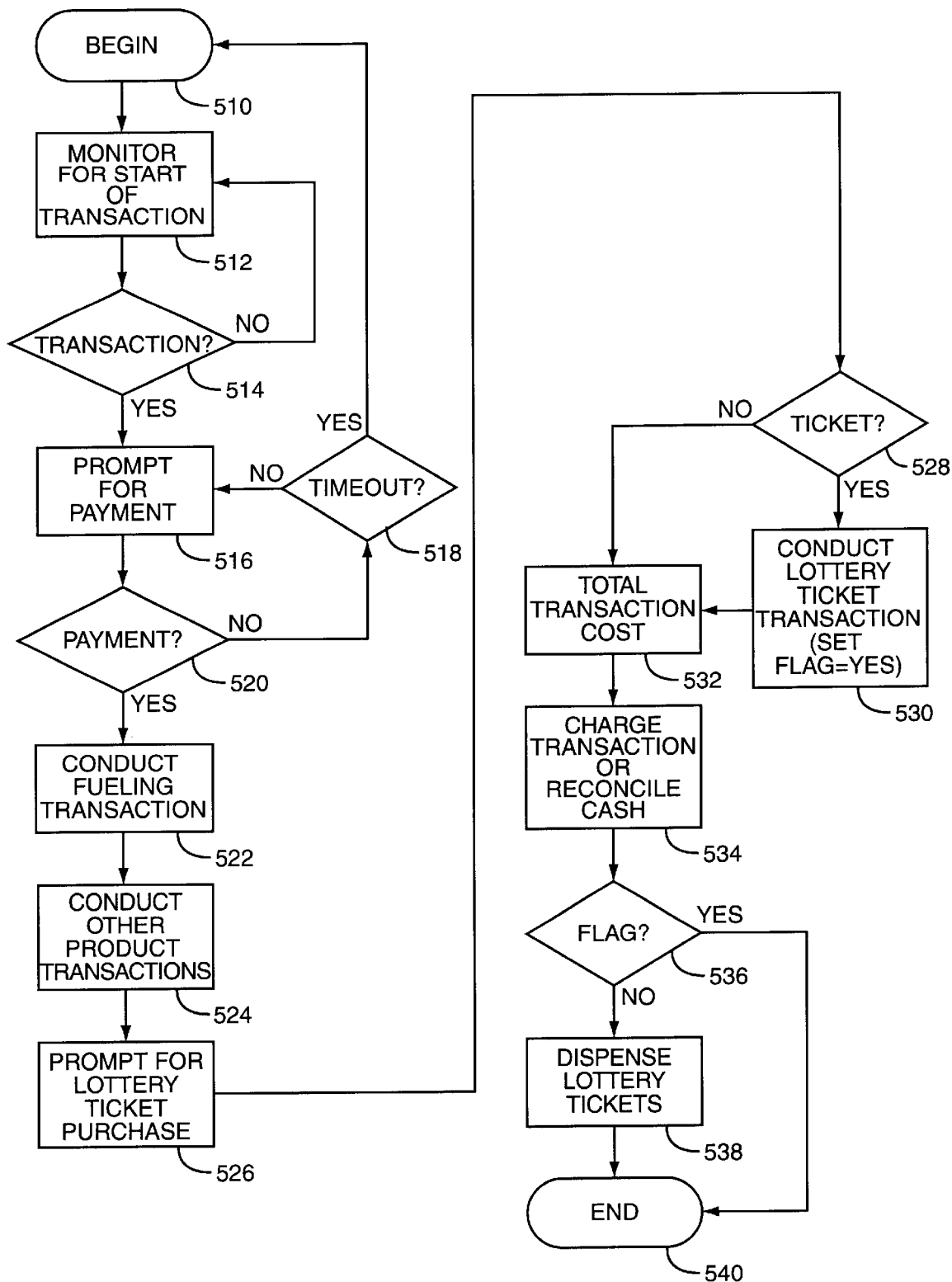
FIG. 5 provides a simplified logic flow diagram for the purchase of a lottery ticket in conjunction with a fueling transaction in the preferred embodiment of the present invention.

FIG. 5 illustrates logical operation of the preferred embodiment of the present invention where each fuel dispenser 122 includes integral lottery ticket dispensing capabilities. Operation begins (block 510) by monitoring for the start of a fueling transaction at the fuel dispenser(s) 122 (block 512). If no transactions are initiated (block 514), monitoring continues (block 512). However, if a transaction is initiated (block 514), the customer is prompted for payment at the fuel dispenser 122 (block 516). If no payment is received (block 520) but the operation has not timed-out (block 518), the fuel dispenser 122 continues to prompt the customer for payment (520). Note that in-store payment for fueling operations is permissible and is provided for in the system of the present invention but is not shown here in the interest of illustrating the manner in which the present invention provides for lottery ticket purchasing through the fuel dispenser(s) 122. If payment is received (block 520), the fuel dispenser 122 permits the customer to conduct the fueling transaction (block 522), else the operation times-out (block 518) and processing begins again (block 510). The control system 130 provide the customer an opportunity to purchase other products and services, such as food products or a car wash (block 524), as well as prompting the customer to purchase a lottery ticket (block 526). If the customer elects to purchase lottery tickets (block 528), the fuel dispenser 122 provides information on its display 316 supporting the ticket selection details and accepts customer selection inputs via its keypads 322 and 314 (block 530). The control system 130 may communicate with a lottery controller 102 in association with the lottery ticket selection and purchase (block 530). Once the customer concludes the lottery ticket transaction, transaction costs are totaled (block 532) and payment for the total transaction cost is settled (block 534). This may entail finalizing credit charges if payment was made via credit/debit card or wireless communication device, or may entail cash reconciliation if the customer pays by cash. If the customer purchased lottery tickets (block 536), the ticket or tickets are dispensed from the fuel dispenser lottery ticket printer 324 (block 538) and the transaction ends. Otherwise, after the transaction payment is settled (block 534), the transaction ends (block 540).

Figure 6A:
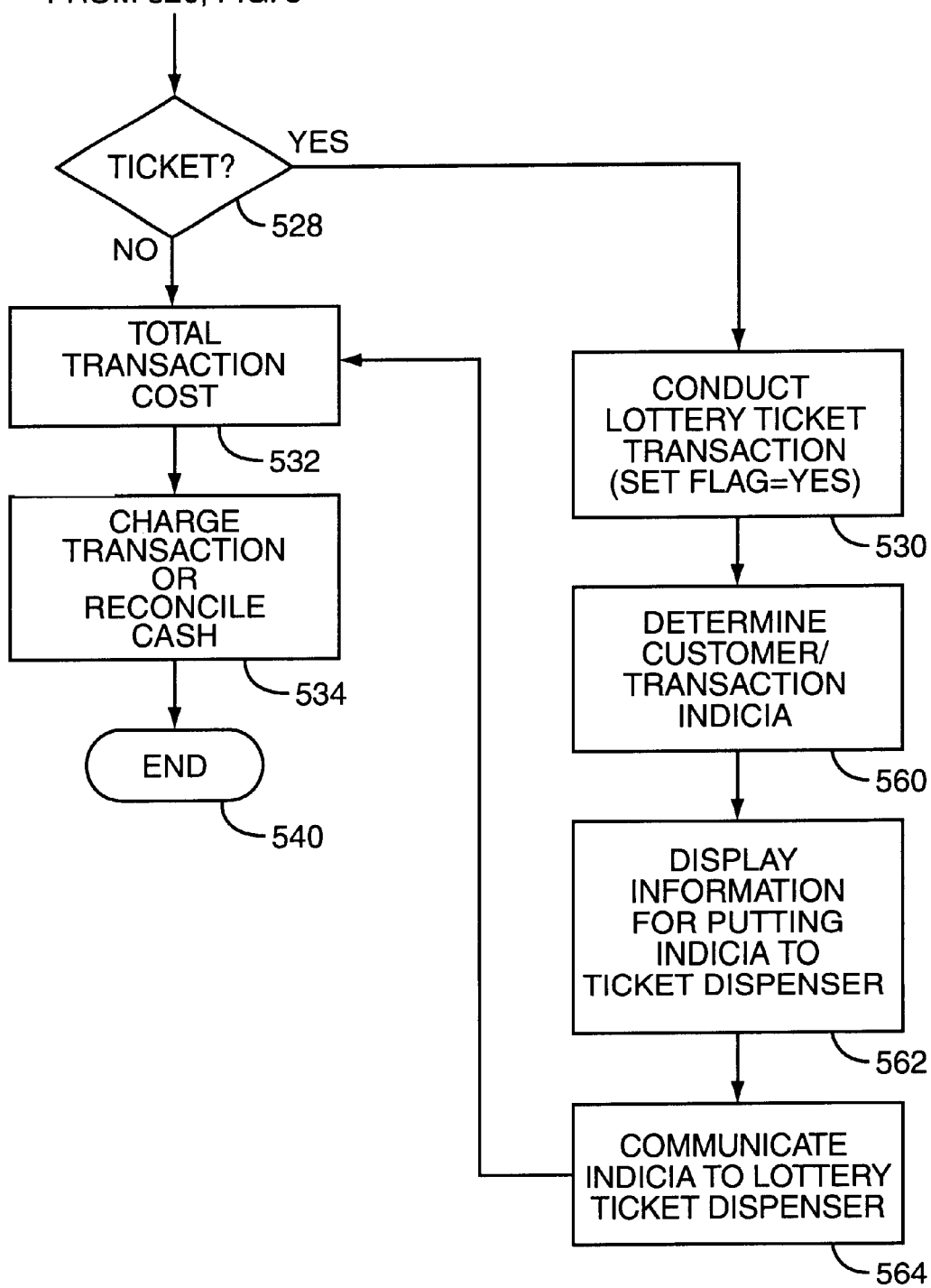
FIG. 6A provides a simplified logic flow diagram for the purchase of a lottery ticket in conjunction with a fueling transaction in an alternate embodiment of the present invention that includes a lottery ticket dispenser apart from the fuel dispenser.
Figure 6B:
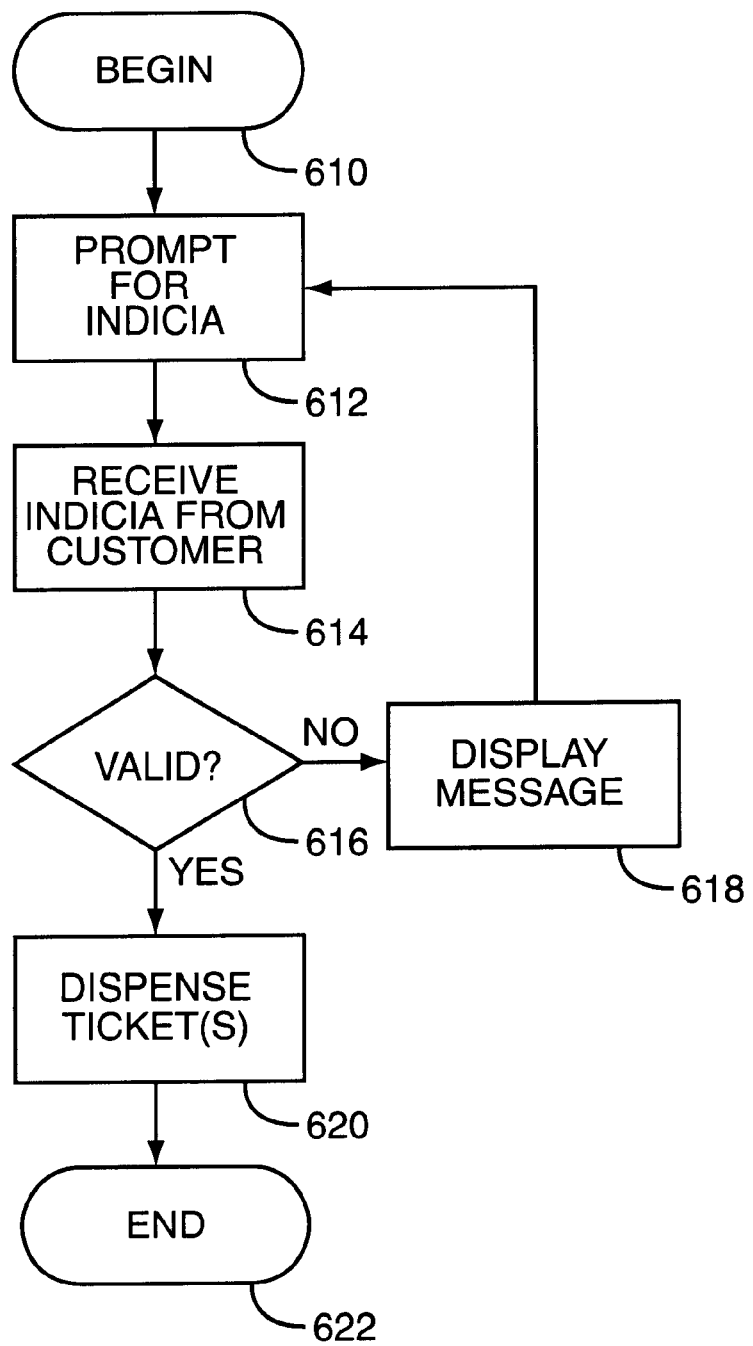
FIG. 6B provides a simplified logic flow diagram for the dispensing a lottery ticket from a separate lottery ticket dispenser based on a lottery ticket purchase made through a fuel dispenser.

FIGS. 6A and 6B together illustrate lottery ticket purchases conducted at a fuel dispenser 122 with a lottery ticket dispenser 410 separate from the fuel dispenser(s) 122, in contrast, FIG. 5 illustrated operation of a fuel dispenser 122 with an integral lottery ticket printer 324. The alternate embodiment of FIGS. 6A and 6B allow a single lottery ticket dispenser 410 to be associated with one or more fuel dispensers 122. In this manner, a single lottery ticket dispenser can serve a fueling island 120, or multiple fueling islands 120. Operation varies from that illustrated in FIG. 5 because now the system 100 must be able to relate a given customer's lottery ticket dispensing request with the corresponding lottery ticket purchase transaction conducted at any one of the fuel dispensers 122. In FIG. 6A, operation up to and including conducting the lottery ticket transaction (block 530) is identical to that described for the corresponding blocks of FIG. 5. However, in FIG. 6A, subsequent to the processing depicted in block 530, the control system 130 must determine an appropriate customer indicia that may be used to match the lottery ticket purchase conducted through the fuel dispenser 122 with the actual lottery ticket dispensing at the separate lottery ticket dispenser 410.

As discussed earlier, the customer indicia may be automatically generated by the fuel dispenser 122 or control system 130 independently, or may be based on a credit/debit card number used by the customer for the transaction, or may be based on information received from the customer's wireless communication device 350, if such a device was used to pay for the transaction. The fuel dispenser 122 displays information on display 316 providing the customer with directions for inputting the appropriate indicia into the separate lottery ticket dispenser 410. The customer/transaction indicia are determined either by the fuel dispenser 122 or the fuel dispenser 122 in combination with the control system 130 (block 560). Instructions regarding how the customer should input the indicia into the separate lottery ticket dispenser 410 are shown on the display 316 of fuel dispenser 122 (block 562). As previously noted, the fuel dispenser 122 may print a transaction receipt including indicia information that the customer may input to the lottery ticket dispenser 410, the customer may be instructed to swipe the same debit/credit card or wireless communication device as used for the purchase transaction, or they may simply be instructed to key an indicia into the remote lottery ticket dispenser 410. The indicia may the then be communicated to the lottery ticket dispenser 410 (block 564).

At this point, processing continues with transaction cost totaling (block 532) and payment settlement (block 534) through to conclusion (block 540). Note that no lottery tickets are dispensed, as the fuel dispenser 122 whose operation is illustrated in FIG. 6A includes no lottery ticket printer 324, relying instead on a separate lottery ticket dispenser 410 for actual ticket dispensing.

FIG. 6B illustrates operation of the separate lottery ticket dispenser 410. Its role in the system 100 is to dispense a lottery ticket or tickets that match each individual customer's lottery ticket purchase transaction conducted at the fuel dispensers 122. Operation begins (block 610) with the lottery ticket dispenser 410 displaying a prompt to input customer indicia on its display 414 (block 612). The customer inputs their associated customer indicia based on instructions provided in block 562 of FIG. 6A. Depending on their method of payment at the fuel dispenser, any of the previously disclosed means for inputting the customer indicia may be used (block 614). If the lottery ticket dispenser 410 successfully matches (block 616) the customer indicia received from the customer with the transaction indicia received from the control system 130 or fuel dispenser 122, it dispenses the lottery ticket(s) previously selected by the customer at the fuel dispenser 122 (block 620) and processing ends (block 622).

If the customer indicia received through the lottery ticket dispenser 410 does not match any of the transaction indicia determined by the control system 130, a message is displayed (block 618) on the display 414 of the lottery ticket dispenser 410, and the lottery ticket dispenser 410 prompts for a new customer indicia. Note that the control system 130 has the capability to store many different transaction indicia at any given time, thereby allowing multiple customers to purchase lottery tickets at the fuel dispensers 122 and subsequently receive their purchased lottery tickets through the separate lottery ticket dispenser 410.

Although detailed descriptions regarding the configuration and operation of the present invention appear above, such details are not meant to limit the scope of the invention in any way. Rather, the foregoing details aid in understanding and practicing the preferred and several alternate embodiments of the present invention. Those skilled in the art will readily appreciate that the system of present invention admits tremendous flexibility in implementation specifics. For example, the specific sequence of fuel dispensing and lottery ticket purchasing may be altered or made simultaneous, or varied in many other ways without departing from the spirit of the present invention. The present invention provides means for purchasing lottery tickets through a fuel dispenser and all variations on the system described herein for accomplishing that means are considered within the scope of the present invention.

What is claimed is:

1. A fuel dispensing system comprising:
   a fuel dispenser including a customer interface for conducting a transaction including a lottery ticket purchase, a payment acceptor for receiving a payment for the transaction, and a lottery ticket dispenser for dispensing lottery tickets; and
   a control system operatively associated with said fuel dispenser and adapted to cause said lottery ticket dispenser in said fuel dispenser to dispense a lottery ticket to a customer in response to receiving the payment for the transaction through said payment acceptor in said fuel dispenser.

2. The fuel dispensing system of claim 1 wherein said payment acceptor comprises a card reader for reading payment information from a customer payment card.

3. The fuel dispensing system of claim 2 wherein the customer payment card is a credit card and said control system is further adapted to communicate with an outside credit authorization network to receive credit authorization for the transaction.

4. The fuel dispensing system of claim 1 wherein said payment acceptor comprises a cash acceptor for receiving a cash payment from the customer.

5. The fuel dispensing system of claim 1 wherein said payment acceptor comprises a wireless communication interface for receiving a wireless signal containing payment information transmitted by a wireless communication device.

6. The fuel dispensing system of claim 1 wherein said control system is further adapted to communicate the transaction information related to the purchase of the lottery ticket to a lottery controller.

7. The fuel dispensing system of claim 1 wherein said lottery ticket dispenser in said fuel dispenser is adapted to dispense a plurality of lottery ticket types.

8. The fuel dispensing system of claim 7 wherein the plurality of lottery ticket types includes a multiple-draw ticket type where the lottery ticket is valid for more than one lottery drawing and is selected in accordance with information input by a customer through said customer interface.

9. The fuel dispensing system of claim 1 wherein said lottery ticket dispenser is adapted to dispense a lottery ticket having customer-selected play numbers and said customer interface in said fuel dispenser is adapted to allow a customer to input said customer-selected play numbers.

10. The fuel dispensing system of claim 1 wherein said lottery ticket dispenser in said fuel dispenser is adapted to dispense a preprinted lottery ticket type.

11. The fuel dispensing system of claim 1 wherein said lottery ticket dispenser in said fuel dispenser is adapted to dispense a random-number lottery ticket type.

12. A fuel dispensing system comprising:
    a fuel dispenser including a customer interface for conducting a transaction including a lottery ticket purchase and a payment acceptor for receiving a payment for the transaction;
    a lottery ticket dispenser associated with said fuel dispenser for dispensing lottery tickets; and
    a control system operatively associated with said fuel dispenser and said lottery ticket dispenser and adapted to cause said lottery ticket dispenser to dispense a lottery ticket to a customer in response to receiving the payment for the transaction through said payment acceptor in said fuel dispenser.

13. The fuel dispensing system of claim 12 wherein said fuel dispensing system generates a transaction indicia related to the purchase of a lottery ticket through said fuel dispenser, said transaction indicia communicated to the customer and to said lottery ticket dispenser by said fuel dispensing system, and further wherein said lottery ticket dispenser is adapted to allow the customer to input said transaction indicia thereby allowing said lottery ticket dispenser to dispense said lottery ticket associated with the purchase.

14. The fuel dispensing system of claim 13 wherein said transaction indicia is communicated to the customer via a printed receipt.

15. The fuel dispensing system of claim 14 wherein said lottery ticket dispenser is adapted to scan said printed receipt to obtain said transaction indicia from the customer.

16. The fuel dispensing system of claim 15 wherein said transaction indicia is based on a customer payment card used to pay for the transaction at the fuel dispenser and said lottery ticket dispenser includes a payment card reader for obtaining said transaction indicia from the customer's payment card.

17. The fuel dispensing system of claim 15 wherein said transaction indicia is based on information received from a wireless communication device associated with the customer and said lottery ticket dispenser is adapted to receive information from the wireless communication device to obtain said transaction indicia from the customer.

18. The fuel dispensing system of claim 14 wherein said payment acceptor comprises a card reader for reading payment information from a customer payment card.

19. The fuel dispensing system of claim 18 wherein the customer payment card is a credit card and said control system is further adapted to communicate with an outside credit authorization network to receive credit authorization for the transaction.

20. The fuel dispensing system of claim 14 wherein said payment acceptor comprises a cash acceptor for receiving a cash payment from the customer.

21. The fuel dispensing system of claim 14 wherein said payment acceptor comprises a wireless communication interface for receiving a wireless signal containing payment information transmitted by a wireless communication device.

22. The fuel dispensing system of claim 14 wherein said control system is further adapted to communicate the transaction information related to the purchase of the lottery ticket to a lottery controller.

23. The fuel dispensing system of claim 14 wherein said lottery ticket dispenser in said fuel dispenser is adapted to dispense a plurality of lottery ticket types.

24. The fuel dispensing system of claim 23 wherein the plurality of lottery ticket types includes a multiple-draw ticket type where the lottery ticket is valid for more than one lottery drawing and is selected in accordance with information input by a customer through said customer interface.

25. The fuel dispensing system of claim 14 wherein said lottery ticket dispenser is adapted to dispense a lottery ticket having customer-selected play numbers and said customer interface in said fuel dispenser is adapted to allow a customer to input said customer-selected play numbers.

26. The fuel dispensing system of claim 14 wherein said lottery ticket dispenser in said fuel dispenser is adapted to dispense a preprinted lottery ticket type.

27. The fuel dispensing system of claim 14 wherein said lottery ticket dispenser in said fuel dispenser is adapted to dispense a random-number lottery ticket type.

28. A fuel dispensing system comprising:
   a plurality of fuel dispensers, each of said plurality of fuel dispensers including a customer interface for conducting a transaction, the transaction including the purchase of a lottery ticket, and a payment acceptor for receiving a payment for the transaction;
   a lottery ticket dispenser associated with said plurality of fuel dispensers for dispensing lottery tickets; and
   a control system operatively associated with said plurality of fuel dispensers and said lottery ticket dispenser and adapted to cause said lottery ticket dispenser to dispense a lottery ticket to a customer in response to receiving the payment for the transaction through said payment acceptor at any one of said plurality of fuel dispensers.

29. The fuel dispensing system of claim 28 wherein said plurality of fuel dispensers are proximate to one another as at a fueling island within a fueling forecourt and said lottery ticket dispenser associated with said plurality of fuel dispensers is also located at the fueling island.

30. The fuel dispensing system of claim 29 wherein said plurality of fuel dispensers are arranged in groups to form a plurality of fueling islands arranged within the fueling forecourt to facilitate simultaneous fueling operations and lottery ticket purchases by a plurality of customers.

31. A method of selling lottery tickets at a fuel dispenser in conjunction with a fueling transaction comprising:
   prompting a customer to conduct a lottery ticket purchase in conjunction with the fueling transaction;
   receiving input from the customer regarding the lottery ticket purchase;
   conducting the fueling transaction;
   effecting payment at said fuel dispenser for a cost associated with the lottery ticket purchase and a cost associated with the fueling transaction;
   dispensing a lottery ticket to the customer corresponding to the lottery ticket purchase.

32. The method of claim 31 wherein said fuel dispenser is adapted to perform said dispensing step.

33. The method of claim 32 wherein a separate lottery ticket dispenser is adapted to perform said dispensing step.

34. The method of claim 33 further comprising the step of determining a transaction indicia and an associated customer indicia corresponding to the lottery ticket purchase, and wherein said separate lottery ticket dispenser is adapted to receive said transaction indicia and said dispensing step requires the customer to input said customer indicia into said separate lottery ticket dispenser so that said customer indicia may be matched to said transaction indicia such that the lottery ticket corresponding to the customer's lottery ticket purchase may be dispensed.

35. The method of claim 33 wherein said fuel dispenser includes a customer interface supporting the input of information by the customer in said receiving step.

36. The method of claim 35 wherein said customer interface supports selection of multiple lottery ticket types, including preprinted number, random number, and customer-selected number lottery ticket types.

37. The method of claim 36 wherein said customer interface of said fuel dispenser is adapted to permit the customer to enter a desired set of play numbers in association with the purchase of a customer-selected number lottery ticket.

38. The method of claim 35 wherein said separate lottery ticket dispenser is associated with a plurality of fuel dispensers and is adapted to dispense lottery tickets corresponding to lottery ticket purchases conducted at any one of said plurality of fuel dispensers.

39. A fuel dispensing system comprising:
   a fuel dispenser including,
      a) a customer interface for conducting a transaction, the transaction including a lottery ticket purchase;
      b) a payment acceptor for receiving a payment for the transaction;
      c) a lottery ticket dispenser for dispensing lottery tickets; and
      d) a control system;
   said control system adapted to cause said lottery ticket dispenser to dispense a lottery ticket to a customer in response to receiving the payment for the transaction through said payment acceptor in said fuel dispenser.

40. A fuel dispensing system comprising:
   a plurality of fuel dispensers, each of said plurality of fuel dispensers including,
      a) a customer interface for conducting a transaction, the transaction including a lottery ticket purchase;
      b) a payment acceptor for receiving a payment for the transaction;
      c) a control system for controlling operation of said fuel dispenser and for communicating transaction information associated with the purchase of a lottery ticket to a remote lottery ticket dispenser; and
   a lottery ticket dispenser associated with said plurality of fuel dispensers for dispensing lottery tickets and adapted to dispense a lottery ticket to a customer based on the transaction information communicated to said lottery ticket dispenser from a given one of said plurality of fuel dispensers.

* * * * *